United States Patent [19]

Satoh et al.

[11] Patent Number: 4,935,263

[45] Date of Patent: Jun. 19, 1990

[54] METHOD FOR MANUFACTURING A STRAIN DETECTOR

[75] Inventors: Hiroshi Satoh; Yoshihiko Utsui; Kuraki Kitazaki; Takashi Taniguchi; Kiyoshi Hayashi, all of Hyogo, Japan

[73] Assignee: Mitsubishi Denki Kabushiki Kaisha, Tokyo, Japan

[21] Appl. No.: 285,554

[22] Filed: Dec. 16, 1988

[30] Foreign Application Priority Data

Dec. 18, 1987 [JP] Japan .................... 62-322006
Dec. 18, 1987 [JP] Japan .................... 62-322007
Jul. 6, 1988 [JP] Japan .................... 63-168407

[51] Int. Cl.$^5$ .................................... B05D 5/12
[52] U.S. Cl. ............................ 427/126.1; 427/438; 427/132
[58] Field of Search ............. 427/126.1, 438, 132

[56] References Cited

U.S. PATENT DOCUMENTS

| | | | |
|---|---|---|---|
| 3,372,037 | 3/1968 | McGrath | 427/438 |
| 3,379,539 | 4/1968 | McGrath | 427/438 |
| 3,385,725 | 5/1968 | Schmeckenbecher | 427/438 |
| 3,861,206 | 1/1975 | Kawafune | 73/141 R |
| 3,911,552 | 10/1975 | Trimble | 228/263.13 |
| 4,002,778 | 1/1977 | Bellis | 427/438 |
| 4,065,757 | 12/1977 | Kardashian | 365/157 |
| 4,098,917 | 7/1978 | Bullock | 427/132 |
| 4,128,691 | 12/1978 | Shirahata | 427/132 |
| 4,414,855 | 11/1983 | Iwasaki | 73/862.36 |
| 4,440,609 | 4/1984 | Blakeslee | 204/44.5 |

Primary Examiner—Shrive Beck
Assistant Examiner—Vi D. Dang
Attorney, Agent, or Firm—Sughrue, Mion, Zinn, Macpeak & Seas

[57] ABSTRACT

A strain detector which has a driven shaft for receiving a stress; a high magnetostrictive rate magnetic layer made of one of Co—B, Co—P, Co—Ni—B, Ni—Fe—P, and Co—Ni—P formed by electroless plating on the outer periphery of the driven shaft; and a detecting coil disposed through a gap on the periphery of the magnetic layer for detecting a variation in the permeability by a strain responsive to the stress of the magnetic layer, a method for manufacturing the strain detector which has the steps of forming a high magnetostrictive plating layer made of one of Co—B, Co—P, Co—Ni—B, Ni—Fe—P and Co—Ni—P by electroless plating on the periphery of the driven shaft; and selectively removing the plating layer to obtain a magnetic layer made of a plurality of magnetic pieces aligned in parallel at a predetermined angle with respect to the central axis of the driven shaft. Thus, the strain detector has high accuracy, high sensitivity and high reliability, and the method for manufacturing the strain detector can inexpensively manufacture the strain detector in good mass productivity.

4 Claims, 10 Drawing Sheets

PRIOR ART

METHOD FOR MANUFACTURING A STRAIN DETECTOR

BACKGROUND OF THE INVENTION

The present invention relates to a strain detector, a method for manufacturing the same and a plating bath therefor.

Figure 1:
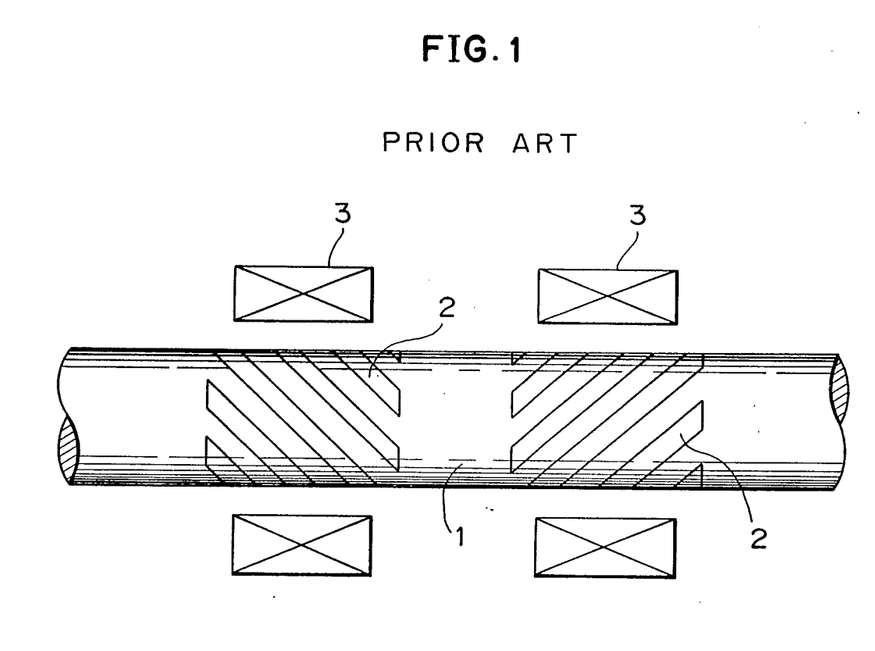
FIG. 1 is a view showing a conventional strain detector.

FIG. 1 shows a conventional strain detector disclosed, for example, in Japanese Patent Disclosure Sho No. 57-211030. In FIG. 1, reference numeral 1 denotes a shaft-shaped driven member for receiving a torque, numeral 2 denotes a pair of magnetostrictive layers made of a high permeability soft magnetic material fixed in a band shape to the driven member 1 to vary its permeability in response to the quantity of an internal strain generated by a torque applied to the driven member 1, and numeral 3 denotes a pair of detecting coils provided on the outer peripheries of the magnetostrictive layers 2 for detecting the quantity of the variation in its permeability. Each magnetostrictive layer 2 is composed of a plurality of rectangular magnetic pieces so arranged as to be laterally symmetrical at ±45° in its extending direction and hence to form an angle of 90° therebetween.

The operation of the strain detector constructed as described above will be described. When a torque is externally applied to the driven member 1, a main stress is generated in the long axial direction of the magnetostrictive layers 2 made of the magnetic piece groups as a main axis. If the main stress is, for example, a tensile force of the magnetic piece group of one magnetostrictive layer 2, it is a compressive force of the piece group of the other magnetostrictive layer 2. Generally, when a stress is applied to a magnetic material in which its magnetostrictive constant is not zero, its magnetic property is varied, with the result that its permeability is altered. This phenomenon is used for a so-called magnetostrictive converter for converting a mechanical energy into an electrical energy. When a magnetic element is deformed, it corresponds to Villari effect in which its permeability is varied in response to the quantity of its deformation. It is known that, when the magnetostrictive constant of the quantity which quantitatively represents the magnitude of the magnetostriction is positive, its permeability increases if a tensile force is acted, while it decreases if a compressive force is acted, whereas when the magnetostrictive constant is negative, vice versa. Accordingly, the deformation responsive to the quantity of the torque applied externally is detected as the variation in the permeability of the magnetostrictive layer 2, and the variation in the permeability is detected as the change of the magnetic impedance by the detecting coil 3 thereby to detect the quantity of the torque applied to the driven member 1 and the quantity of the strain upon the application of the torque.

In a conventional strain detector disclosed in Japanese Patent Disclosure Sho No. 59-164931, a masking pattern is wound on the outer periphery of a driven member applied with a stress, and Ni is plated thereon by electrolytic plating to form magnetostrictive layers made of magnetic piece groups.

Figure 2:
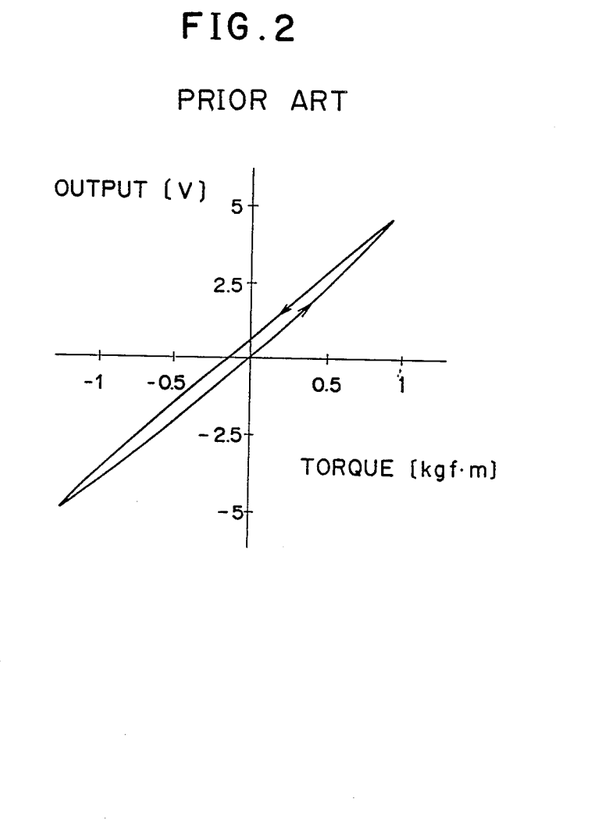
FIG. 2 is a view showing the output hysteresis characteristic of the conventional strain detector.

However, in such a conventional strain detector, the magnetic layers are formed by Ni plating by electrolytic plating, the electrolytic plating generally has crystalline characteristic to form large magnetic domains, large coercive force Hc, and relatively low magnetostrictive sensitivity. As shown in FIG. 2, its output characteristic generates a hysteresis. Since its permeability is not so large, the Ni plating also decreases its detecting sensitivity. Further, the skin depth of its magnetic flux, i.e., the penetrating depth $\delta$ of the magnetic flux is $$\delta = \sqrt{2/\omega \sigma \mu}$$

($\omega$: the angular frequency of a current applied to the detecting coil, $\sigma$: conductivity, $\mu$: permeability). Since the $\mu$, $\sigma$ are not so large in the case of the Ni plating, the skin depth $\delta$ becomes relatively large, the magnetic flux does not concentrically pass in the magnetic layers 5 and 6, and its detecting sensitivity decreases.

The conventional method of forming the magnetostrictive layers 2 includes the step of forming a so-called chevron pattern by Ni electrolytic plating using a mask pattern or etching after Ni electrolytic plating, but it is not easy to accurately form the magnetic pieces by such pattern plating.

Further, the magnetostrictive layers 2 of uniform thickness are scarcely obtained by the concentration of an electric field by electrolytic plating, and a detecting error feasibly occurs due to the difference of thermal stresses. Moreover, a large-scale apparatus is required by electrolytic plating and it lacks its mass productivity.

SUMMARY OF THE INVENTION

The present invention has been made to solve the above-described subject, and has for its object to provide a strain detector which has high accuracy, high sensitivity and high reliability, a method for manufacturing a strain detector which can inexpensively manufacture the strain detector in good mass productivity, and a plating bath for manufacturing the same.

The magnetic layer of the strain detector according to the present invention is made of one of Co—B, Co—P, Co—Ni—B, Ni—Fe—P, and Co—Ni—P formed directly on a driven member by electroless plating, and is generally of a soft magnetic amorphous state. Thus, it has small magnetic domain, small coercive force Hc, and large magnetostriction rate. Since the permeability and the conductivity are large, the skin depth $\delta$ of the magnetic flux is small, and the magnetic flux concentrically passes.

The method for manufacturing the strain detector according to the present invention comprises the steps of forming a plating layer of high magnetostriction rate made of one of Co—B, Co—P, Co—Ni—B, Ni—Fe—P, and Co—Ni—P by electroless plating on the periphery of the driven member, and obtaining a plurality of magnetic layers made of magnetic pieces by selective film removing applied to the plating layer.

Therefore, no positional accuracy is necessary at the time of forming the plating layer, and the positional accuracy of the magnetic pieces is obtained within the range of the error of selective film removing.

Further, the plating bath for manufacturing the strain detector according to the present invention is formed by dissolving metal salts of iron and nickel in an aqueous solution which contains a reducing agent and a complexing agent.

In the present invention, the magnetostrictive layer is formed by electroless plating, and no electric field concentration occurs. Further, the electroless plating does not need a power source and electrodes, and the drive member is merely dipped in the plating bath.

The magnetostrictive layers thus formed mainly contain iron and nickel having high permeability as main ingredients.

DESCRIPTION OF THE PREFERRED EMBODIMENTS

Figure 3:
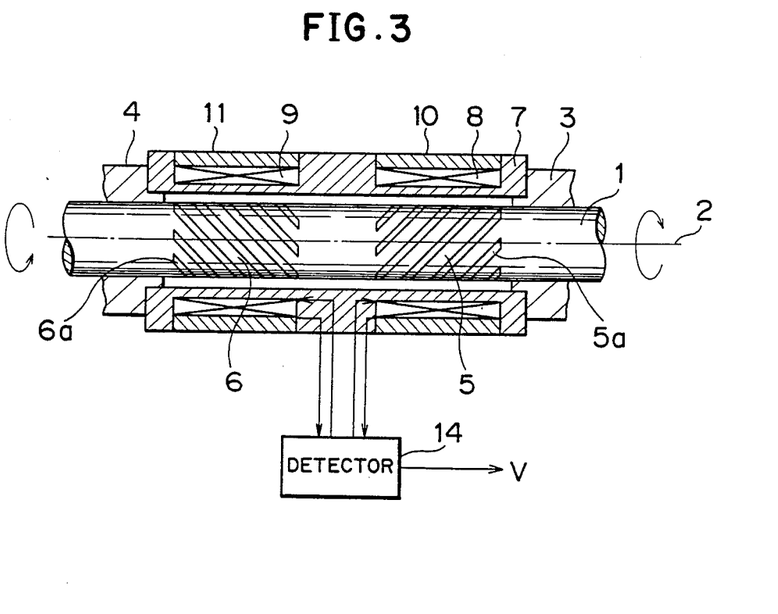
FIG. 3 is a view showing an embodiment of a strain detector according to the present invention.

An embodiment of the present invention will be described below in conjunction with the drawings. In FIG. 3, reference numeral 1 denotes a driven shaft made of stainless steel of a driven member made, for example, of a rotational shaft, numeral 2 denotes a central axis of the driven shaft 1, and numerals 3 and 4 denote bearings for rotatably supporting the driven shaft 1. First and second magnetic layers 5 and 6 are fixed to the outer periphery of the driven shaft 1. The magnetic layers 5 and 6 are formed by electroless plating, and made of any of Co—B, Co—P, Co—Ni—B, Ni—Fe—P, and Co—Ni—P. The electroless plating means in this specification chemically reducing plating to chemically reduce metallic ions in the plating solution by a reducing agent and to precipitate a plating film having an arbitrary thickness such as, for example, approx. 30 microns on the driven shaft 1. The first magnetic layer 5 is formed of a plurality of rectangular magnetic pieces 5a aligned in parallel with a direction of +45° with respect to the central axis 2, and the second magnetic layer 6 is formed of a plurality of magnetic pieces 6a aligned in parallel with a direction of −45° with respect to the central axis 2. A cylindrical coil bobbin 7 is disposed coaxially with the driven shaft 1 through a gap on the outer peripheries of the magnetic layers 5 and 6. First and second detecting coils 8 and 9 are wound correspondingly to the first and second magnetic layers 5 and 6 on the outer periphery of the coil bobbin 7, and the detecting coils 8 and 9 are respectively connected to a detector 14. Numerals 10 and 11 denote first and second magnetic focusing layers made of high permeability material formed on the peripheries of the detecting coils 8 and 9.

The operation of the strain detector constructed as described above will be described. When a torque is applied externally to the driven shaft 1, a stress is propagated from the driven shaft 1 to the magnetic layers 5 and 6 to generate a tensile force at one of the magnetic layers 5 and 6, and to also generate a compressive force at the other, thereby generating a strain or a distortion. When this distortion is generated, the permeabilities of the magnetic layers 5 and 6 are varied in such a manner that the permeabilities are varied in reverse directions in cases of the tensile force and the compressive force. A current of a predetermined frequency is applied to the detecting coils 8 and 9, a magnetic flux generated thereby crosses the magnetic layers 5 and 6, and the variation in the permeability is detected as the change of the magnetic impedance. The detector 14 inputs the outputs of the detecting coils 8 and 9, and outputs a detection voltage V responsive to the quantity of the strain of the driven shaft 1.

Figure 4:
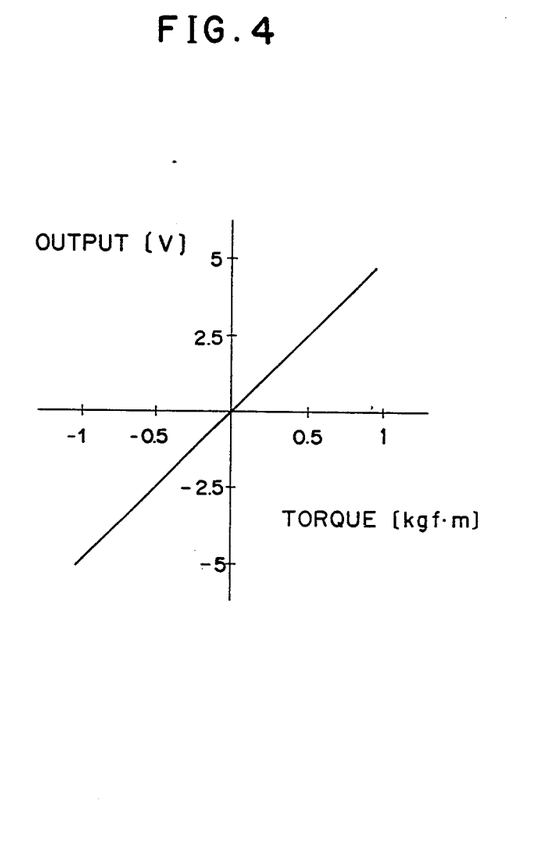
FIG. 4 is a view showing the output of the strain detector of the present invention.

The electroless plating means in this case a chemical reducing plating to chemically reduce metallic ions in the plating solution and to precipitate a plating film of an arbitrary thickness on the driven shaft 1. In the embodiment described above, the magnetic layers 5 and 6 made of high permeability material as described above are formed in thickness of approx. 30 microns on the driven shaft 1 by the electroless plating. The magnetic layers 5 and 6 described above are generally in soft magnetic amorphous state, having small magnetic domain and small coercive force Hc. Thus, its magnetostriction rate is large, the variation in the permeability due to the strain is large, and the sensitivity of detecting the strain is improved. Further, as shown in case of 78Co-8Ni-4P in FIG. 4, the linearity of the output is improved.

Figure 5:
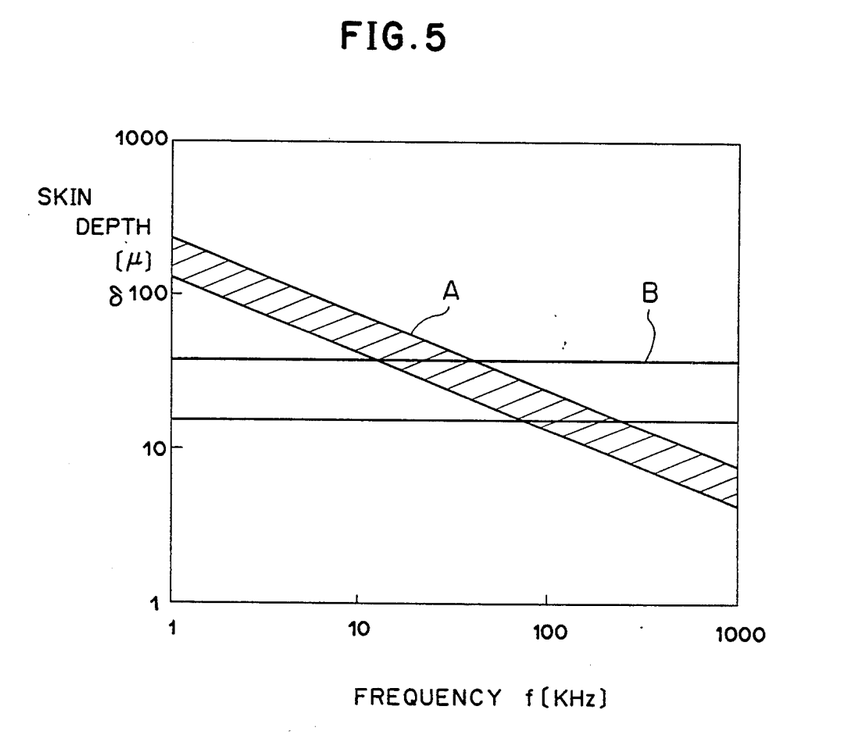
FIG. 5 is a view showing the relationship between the frequency of a current applied to a detecting coil and the penetration depth of a magnetic flux.

The amorphous metal ordinarily has conductivity $\sigma = 130-160$ $\mu\Omega\cdot cm$, permeability $\mu = 5000-10,000$. Thus, both the $\sigma$ and $\mu$ are high, the penetration depth $\delta$ of the magnetic flux generated by a current applied to the detecting coils 8 and 9 at the time of detection, to the magnetic layers 5 and 6 becomes small, the magnetic flux concentrically passes the magnetic layers 5 and 6 to increase the variation in the magnetic impedance due to the strain, thereby improving the detecting sensitivity. FIG. 5 shows the relationship between the frequency of the current applied to the detecting coils 8 and 9 and the penetration depth $\delta$ from the skin, wherein symbol A denotes the relationship, and symbol B denotes the range of the thickness capable of manufacturing the amorphous layer. Therefore, the frequency of the applied current desirably ranges 10 to 100 kHz. If this range exceeds 100 kHz, the load of the circuit increases, while if this range is less than 10 kHz, it is affected by the influence of the pinhole of the amorphous layer.

Since the detecting sensitivity is improved as described above, the efficiency is improved, the current applied to the detecting coils 8 and 9 can be reduced, the heats generated in the detecting coils 8 and 9, and the transistors, capacitors and resistors of the detector 14 are reduced to decrease power ON drive, aging time and year change, thereby improving the reliability.

Figure 6:
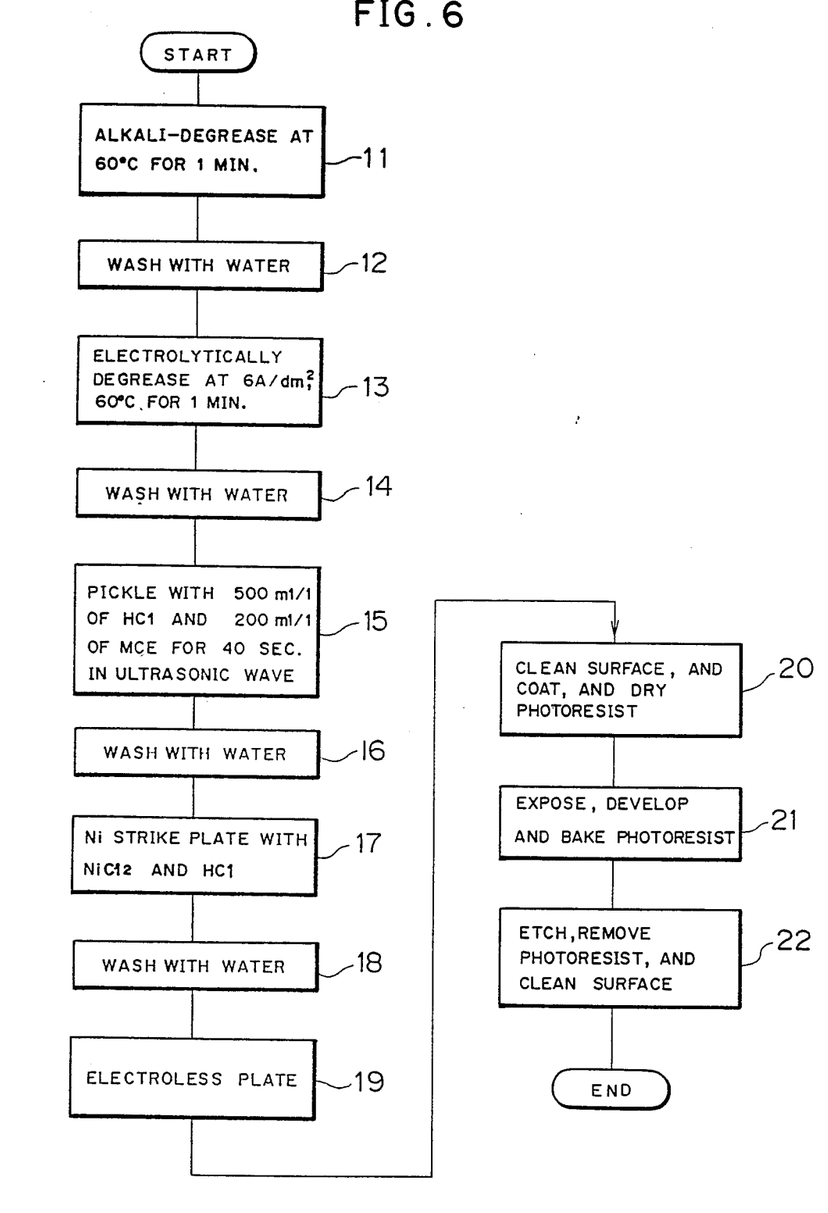
FIGS. 6 to 8 are flowcharts showing different embodiments of a method for manufacturing the strain detector according to the present invention.

The first embodiment of a method for manufacturing the strain detector and hence the magnetic layers 5 and 6 will be described according to a flowchart in FIG. 6. In this case, steps 11 to 18 denote a pretreating flow. In step 11, the driven shaft 1 made of stainless steel is alkaline-degreased at 60° C. for 1 min., and washed with water in step 12. In step 13, the driven shaft 1 is electrolytically degreased by 6 A/dm$^2$ of current density at 60° C. for 1 min., and washed with water in step 14. Then, in step 15, in order to remove the chromium oxide on the surface of the driven shaft 1, it is pickled with solution of 500 ml of HCl/l and 200 ml/l of MCE (trade name) in ultrasonic wave for 40 sec., and, in step 16, it is washed with water. Then, in step 17, it is Ni-strike plated (base plated) in plating solution of NiCl$_2$ and HCl. This is conducted so as to improve the draping of the electroless plating. In step 18, it is washed with water. Then, in step 19, it is electroless plated wite Co—Ni—P (Co: 40 to 95 wt. %, and the magnetostriction constant is particularly increased by 60 to 90 wt. %) to form the plating layer. Steps 20 to 22 denote posttreating steps. In step 20, the surface of the plated layer is cleaned, and the photoresist is coated and dried. In step 21, the photoresist is exposed, developed, and baked. In step 22, the photoresist is etched and removed, the surface is cleaned, and the plating layer is selectively removed to form magnetic layers 5 and 6 made of a plurality of magnetic pieces 5a and 6a, respectively.

Figure 7:
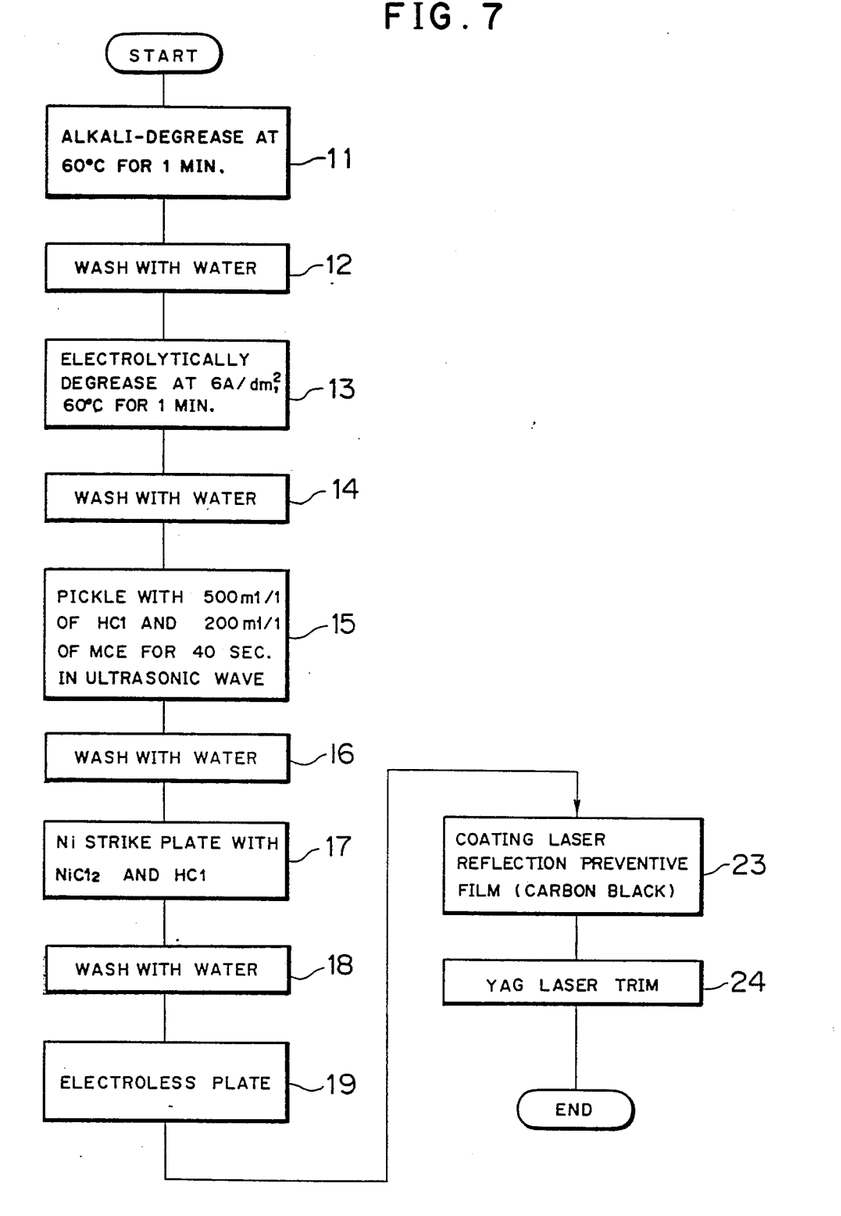

FIG. 7 shows a flowchart in another embodiment of a method for manufacturing the strain detector according to the present invention. After the plating layer is formed on the driven shaft 1 by electroless plating in step 19, the plating layer is coated with a laser reflection preventive film (carbon black) in step 23. In step 24, it is laser trimmed/and the plating layer is selectively removed to form the magnetic layers 5 and 6 made of the magnetic pieces 5a and 6a, respectively.

In the embodiments described above, after the plating layer is formed by electroless plating on the driven shaft 1, the plating layer is selectively removed to form the magnetic layers 5 and 6 made of the magnetic pieces 5a and 6a, respectively. Thus, it is not necessary to consider the positional accuracy of the plating layer at the time of forming the plating layer to easily form the plating layer, and the magnetic layers 5 and 6 can be formed accurately and easily by forming the magnetic pieces 5a and 6a by selectively removing them thereafter.

The magnetic layers 5 and 6 are formed by electroless plating generally in an amorphous state, thereby providing small magnetic domain, small coercive force Hc to increase the magnetostrictive rate and improve the strain detecting sensitivity.

The amorphous metal ordinarily has conductivity $\sigma = 130$ to $160$ $\mu\Omega$.cm, permeability $\mu = 5000$ to $10,000$. Both the $\mu$ and $\sigma$ are high, and the penetration depth $\delta$ of the magnetic flux generated by the current applied to the detecting coils 8 and 9 to the magnetic layers 5 and 6 at the time of detection becomes small to reduce the thicknesses of the magnetic layers 5 and 6 and to concentrically pass the magnetic flux. Therefore, the variation in the magnetic impedance due to the strain is increased, thereby improving the detecting sensitivity.

In the embodiments described above, the examples of photoetching, laser trimming have been described as the selective film removing. However, the present invention is not limited to the particular embodiments. For example, plasma etching, ion etching, electron beam irradiating may be conducted.

Figure 8:
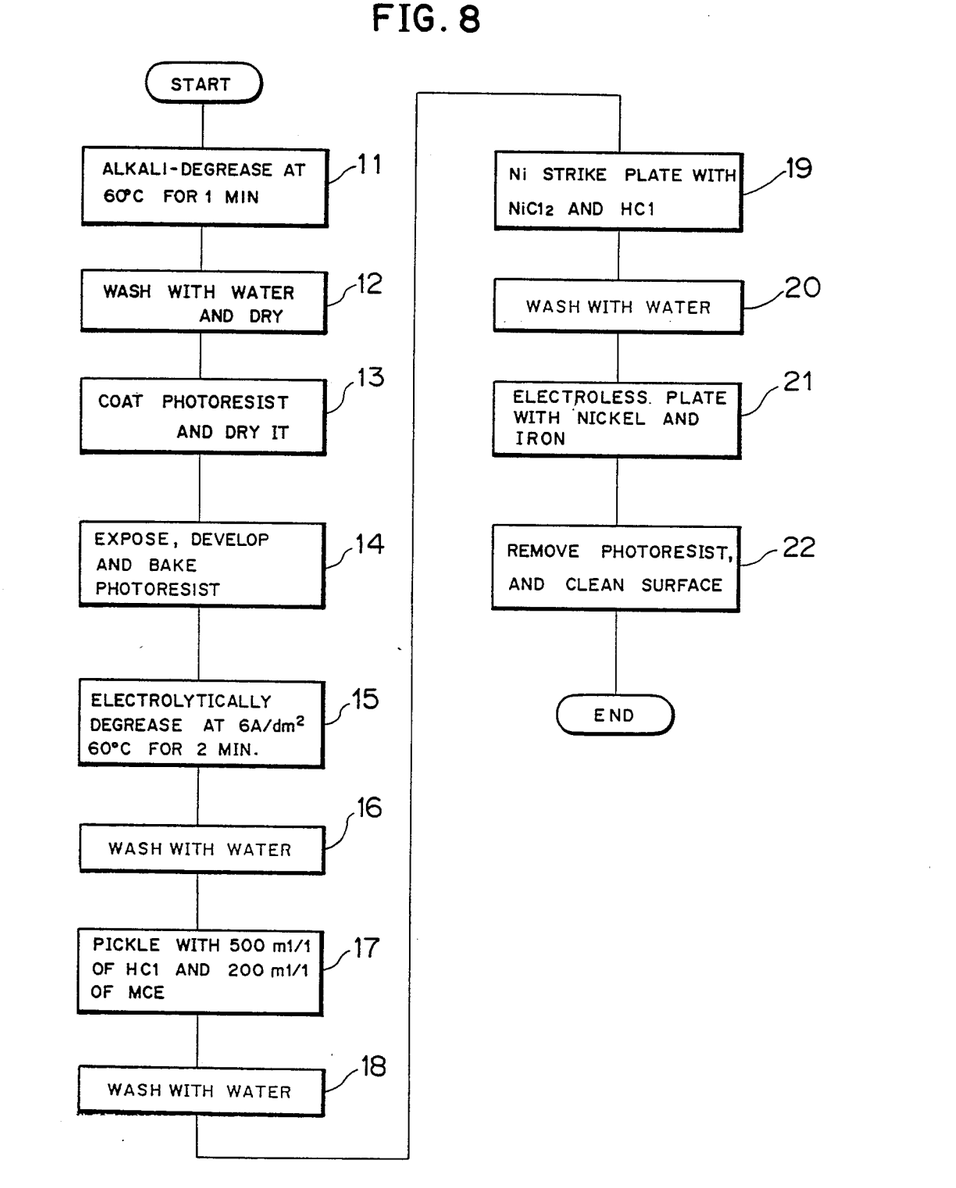

FIG. 8 is a flowchart showing still another embodiment of a method for manufacturing a strain detector according to the present invention. In step 11, the driven shaft 1 formed of a round rod made of SUS304 and having 16 mm of diameter is degreased at 60° C. for 1 min., and washed with water and dried in step 12. In step 13, the driven member 1 is coated with photoresist, and dried. In step 14, the photoresist is exposed, developed and baked to form a predetermined mask pattern. In step 15, the exposed portion of the driven member 1 is electrolytically degreased by 6 A/dm$^2$ of current density at 60° C. for 2 min., and washed with water in step 16. Then, in step 17, in order to remove the chromium oxide on the exposed portion of the driven member 1, it is pickled with a solution of 500 ml/l of HCl and 200 ml/l. of MCE (trade name) in ultrasonic wave for 40 sec., and washed with water in step 18. In step 19, the exposed portion of the driven member 1 is Ni strike plated (base plated) in plating solution of NiCl$_2$ and HCl. This is conducted so as to improve the draping of the electroless plating. In step 20, it is washed with water. Then, in step 21, it is electrolessly plated from above the strike plating. This is conducted by dipping the driven member 1 in a plating bath.

The composition of the plating bath contains 0.02 mol/l of nickel sulfate, 0.08 mol/l of iron sulfate, 0.2 mol/l of sodium hypophosphite, 0.25 mol/l of sodium citrate and 0.5 mol/l of boric acid at 9.0 of pH and 90° C. The sodium hypophosphite is used as a reducing agent for reducing metallic ions, and sodium citrate is a complexing agent for preventing the metallic ions from precipitating in the alkali. Further, the boric acid is mixed to improve the precipitation of iron and nickel. The magnetostrictive layer 2 of chevron pattern is formed by electroless plating. The thickness of the plated film is 25 microns by considering the skin depth of the magnetic flux with the frequency of the magnetic flux generated by the energization of the detecting coil 3 as 40 kHz. In step 22, the photoresist is removed, and the surface is cleaned. The detecting coils 3 are separately manufactured.

The composition of the plating bath may also contain (by mol/l of unit) 0.05 of nickel sulfate, 0.05 of iron sulfate, 0.2 of sodium hypophosphite, 0.25 of sodium tartrate, 0.5 of boric acid, 0.5 of ammonium sulfate at 9.0 of pH and 90° C. Dimethylamine boran may be used instead of the sodium hypophosphite as the reducing agent, or both may be used. Sodium tartrate may be used instead of the sodium citrate as the complexing agent, and both may be used.

The plated film of an alloy which mainly contains iron and nickel for forming the magnetostrictive layer 2 contains 40 to 90 wt. % of nickel, 5 to 50 wt. % of iron to provide high permeability and high magnetostriction rate, and specially optimally contains 40 to 60 wt. % of nickel and 30 to 50 wt. % of iron.

Figure 9:
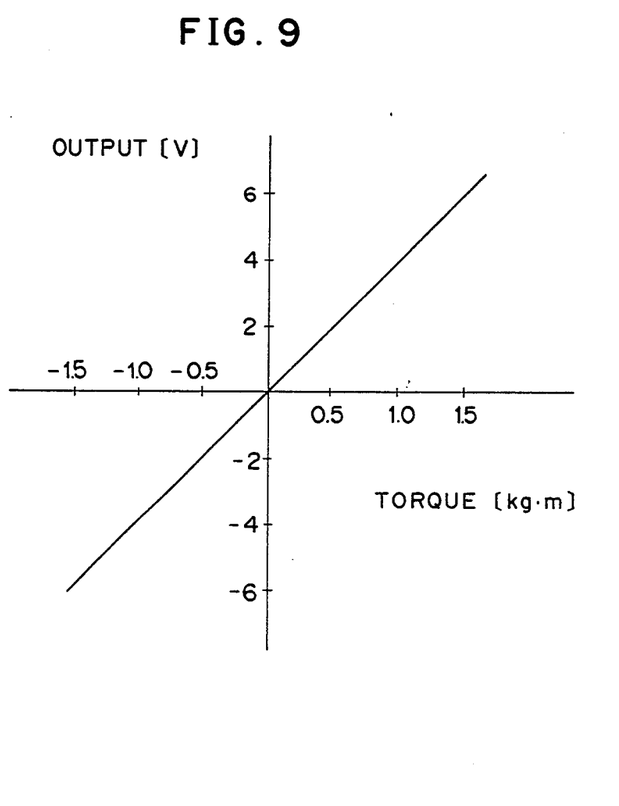
FIGS. 9 and 10 are views showing the output characteristics of the strain detector manufactured according to the method for manufacturing the strain detector according to the invention.
Figure 10:
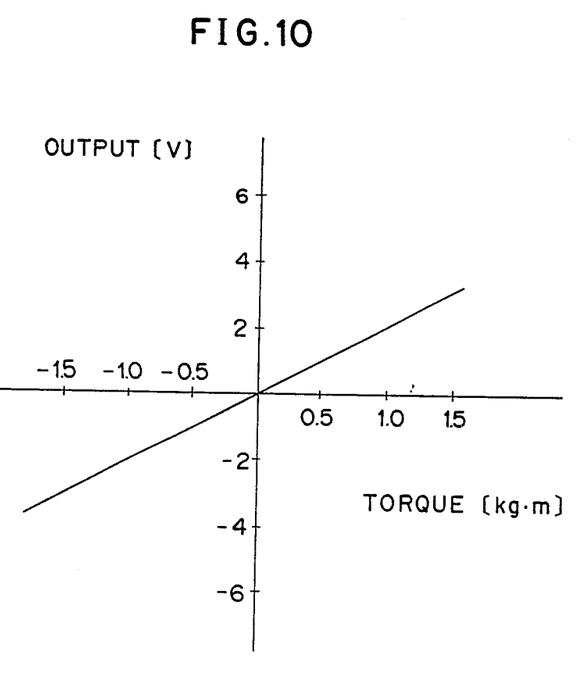

FIGS. 9 and 10 show the output characteristics of the strain detector of the construction as described above, FIG. 9 shows the case of approx. 50% of Ni and 50% of Fe of the magnetostrictive layer 2, and FIG. 10 shows the case of approx. 80% of Ni and 20% of Fe.

The plating bath described above may be also used in the case of forming the magnetostrictive layer 2 of chevron pattern, for example, by initially uniformly forming an electroless plating layer and then etching in addition to the manufacturing method described above.

According to the present invention as described above, the magnetic layer is formed of one of Co—B, Co—P, Co—Ni—B, Ni—Fe—P and Co—Ni—P formed by electroless plating, the magnetic layer generally becomes the soft magnetic amorphous state to increase the magnetostriction rate, thereby improving the strain detecting sensitivity and the linearity of the output.

Further, the magnetostrictive layer is formed by electroless plating, which does not concentrate the electrolysis to provide uniform film thickness, thereby improving the reliability, reducing thermal stress and improving the sensitivity. Moreover, since the magnetic layer has small penetration depth of the magnetic flux with high permeability to increase the concentration of the magnetic flux, thereby improving the sensitivity. In addition, the efficiency is increased by the improvement in the sensitivity to reduce the current applied to the detecting coil, thereby decreasing the heat generated and lengthening the life. Furthermore, since the magnetic layer is formed directly on the driven shaft, the thermal stress is decreased to improve the temperature characteristics.

According further to the method for manufacturing the strain detector of the present invention, the plating layer is formed by electroless plating on the periphery of the driven shaft, and the plating layer is then selectively removed to form a plurality of magnetic layers made of magnetic pieces. Thus, since the positional accuracy of the magnetic pieces are obtained by the selective film removing for easily obtaining the positional accuracy by electroless plating, the accurate positional accuracy can be readily obtained to improve the sensitivity.

Further, when the pattern plating is conducted by electroless plating after the mask pattern is formed on the driven member, the magnetostrictive layer of the chevron pattern may be accurately formed. Moreover, the electroless plating does not need an electric facility but may need only to dip the driven member in the plating bath, thereby inexpensively manufacturing the strain detector in high mass productivity. Furthermore, the magnetostrictive layer may be formed of the alloy which mainly contains iron and nickel by dissolving the metal salts of the iron and nickel to enhance the permeability and the magnetostriction rate, thereby improving the sensitivity.

What is claimed is:

1. A method for manufacturing a strain detector comprising the steps of:
    forming a high magnetostrictive plating layer made of one of Co—B, Co—P, Co—Ni—B, Ni—Fe—P and Co—Ni—P by electroless plating on the periphery of a driven shaft to be subjected to stress; and
    selectively removing the plating layer to obtain a magnetic layer made up of a plurality of magnetic elements aligned in parallel at a predetermined angle with respect to a longitudinal axis of said driven shaft.

2. The method according to claim 1, wherein said selectively removing step is selected from the group comprising photoetching, plasma etching, ion etching, laser tripping and electron beam irradiating.

3. A method for manufacturing a strain detector for an arrangement including a driven member to be subjected to an external force, a magnetostrictive layer made of a high permeability rate soft magnetic material formed on a surface of said driven member, and a detecting coil disposed near said magnetostrictive layer for detecting a variation in the permeability thereof due to a strain resulting from said external force, said method comprising the steps of:
    forming a predetermined mask pattern on the surface of said driven member;
    removing an oxide film from an exposed portion of said driven member; and
    forming the magnetostrictive layer by electroless plating on the exposed portion of said driven member.

4. A method for manufacturing a strain detector for an arrangement including a driven member to be subjected to an external force, a magnetostrictive layer made of a high permeability soft magnetic material formed on a surface of said driven member, and a detecting coil disposed near said magnetostrictive layer for detecting a variation in the permeability thereof due to a strain resulting from said external force, said method comprising the steps of:
    (a) forming a plating bath comprising an aqueous solution containing a reducing agent including at least one of sodium hypophosphite and dimethylamine borane and a complexing agent including at least one of citrate and tartrate, and metal salts of at least nickel and iron dissolved in said aqueous solution; and
    (b) dipping said driven member in said bath to form, by electroless plating, a magnetostrictive layer containing iron and nickel as main ingredients on the surface of said driven member.

* * * * *